United States Patent [19]

Potts

[11] Patent Number: 4,501,367

[45] Date of Patent: Feb. 26, 1985

[54] STANDS FOR SUPPORTING FOOD SHELLS DURING PREPARATION AND CONSUMPTION

[76] Inventor: C. P. Potts, 3201 McEvoy Dr., Macon, Ga. 31206

[21] Appl. No.: 182,488

[22] Filed: Aug. 29, 1980

[51] Int. Cl.³ .............................................. A47F 7/00
[52] U.S. Cl. ..................................... 211/13; 248/346
[58] Field of Search ................... 211/13, 14; 248/346, 248/310, 311.2; D7/70, 1, 7, 130; 99/450.6, 426

[56] References Cited

U.S. PATENT DOCUMENTS

| | | |
|---|---|---|
| D. 25,475 | 5/1896 | Wojidkow . |
| D. 146,338 | 2/1947 | Manzeroll . |
| D. 168,690 | 1/1953 | Kalt . |
| D. 194,119 | 11/1962 | Perl . |
| D. 211,043 | 5/1968 | Kayo . |
| D. 219,163 | 11/1970 | Welsh ................... D7/70 |
| D. 226,126 | 1/1973 | Washburn et al. ................... D7/70 |
| D. 236,175 | 8/1975 | Wintz ................... D7/70 X |
| D. 242,301 | 11/1976 | Little ................... D7/130 |
| 3,642,239 | 2/1972 | Zeiler ................... 248/310 X |
| 4,055,670 | 10/1977 | Belmont ................... 426/119 |

Primary Examiner—Robert W. Gibson, Jr.
Attorney, Agent, or Firm—Browdy and Neimark

[57] ABSTRACT

A stand for supporting taco shells in an upright position facilitates filling the shells for preparation, as well as supporting the shells for consumption, and minimizes loss of the shell contents through spilling by maintaining the shells upright in a mouth open orientation. The stand employed for filling is bowl-shaped with two opposing U-shaped slots disposed in opposing wall portions of the bowl. The stand used for assisting consumption of the filled shell is also bowl-shaped, but only includes one U-shaped slot disposed in a wall portion of the bowl. Both devices include horizontally extending feet for contact with the bowl-supporting surface to stabilize the bowl on the surface. Use of the stand for filling the shell contemplates placing an empty folded shell diametrically across the bowl so that the bottom of the shell contacts the bight of each U-shaped slot. Use of the stand for assisting consumption of the filled shell requires positioning one end of the filled shell in the slot and the bowl, with the bottom of the shell contacting the bight of the U-shaped slot.

8 Claims, 6 Drawing Figures

STANDS FOR SUPPORTING FOOD SHELLS DURING PREPARATION AND CONSUMPTION

FIELD OF THE INVENTION

The present invention relates to stands, and more particularly to a stand or holder for supporting folded crepelike food shells, e.g. taco shells, in an upright position to facilitate filling thereof or to support the filled shells during eating.

BACKGROUND OF THE INVENTION

A recent development in the fast-food business is the expansion into exotic and unusual cuisines, as for example, Chinese, Belgian, Mideastern and Mexican. The foods which have been promoted in these businesses include crepes, pancakes, breads, or pastries, and many times these foods are offered with fillings of one kind or another as, for example, Mexican tacos and Mideastern Pita (or pocket) bread. Eating these foods oftentimes presents problems since the fillings usually are loose, juicy and tend to fall out of their shells, before they can be consumed. Moreover, the fast-food industry has provided few, if any, devices which support these shells in an upright position for filling, and no devices are available for use in supporting the filled shells while being consumed.

The patent literature does show some support devices for food products, e.g. U.S. Pat. No. D. 146,338 illustrates an egg cup, and U.S. Pat. Nos. D. 194,199 and D. 211,043 show stands for various types of foods. U.S. Pat. No. 4,055,670 discloses a package for transporting a plurality of tortilla or taco shells. These patented devices do not, however, solve the needs set forth above.

SUMMARY OF THE INVENTION

It is, therefore, an object of the invention to overcome deficiencies in the prior art, such as indicated above; another object is to provide for the improved holding of food products.

It is a further object of the present invention to provide a stand which will facilitate filling and/or holding of a folded crepe-like food, or a pocket bread or the like.

Another object of the present invention is to provide a holder for a filled folded food which will maintain the food in an upright position and prevent spillage of its contents during consumption.

Yet another object of the invention is to provide an easily cleanable, stable stand for supporting a filled food, such as a crepe, bread, pastry or taco.

Still another object is to provide a stand for folded food having a bowl with first and second gripping means, the first means securing the food within the bowl, and the second gripping means permitting the bowl to be lifted from the bowl supporting surface.

Accordingly, the present invention provides for a stand which supports a folded food shell in an upright position so that the shell may be filled as necessary, or consumed when filled. The stand includes a substantially cylindrical bowl having at least one U-shaped cut-out or slot in the wall of the bowl. The shell is positioned within the stand by inserting a portion of the shell into the bowl through the cut-out so that the folded portion of the shell rests adjacent the bight of the cut-out and extends parallel to the surface supporting the bowl. One embodiment of the stand has a single U-shaped cut-out or slot in one region of the bowl wall. This stand is useful a support for one end of the filled shell during consumption of the food. Another embodiment of the stand includes opposing U-shaped cut-outs or slots, disposed on opposite sides of the bowl facilitating support of the shell in its middle while being filled in preparation for consumption.

BRIEF DESCRIPTION OF THE DRAWINGS

Other objects and many of the attendant advantages of this invention will readily be appreciated as the same becomes understood by reference to the following detailed description when considered in connection with the accompanying drawings in which:

FIG. 2 being a front elevational view, partly in section, taken along line 2—2 of FIG. 1;

FIG. 3 being a side view of shell holder 10 taken along line 3—3 of FIG. 2 in use;

FIG. 4 being a top view of shell holder 100;

FIG. 5 being a frontal view of shell holder 100; and

FIG. 6 being a side elevational view of the shell holder of FIGS. 4 and 5.

DETAILED DESCRIPTION OF THE INVENTION

Figure 1:
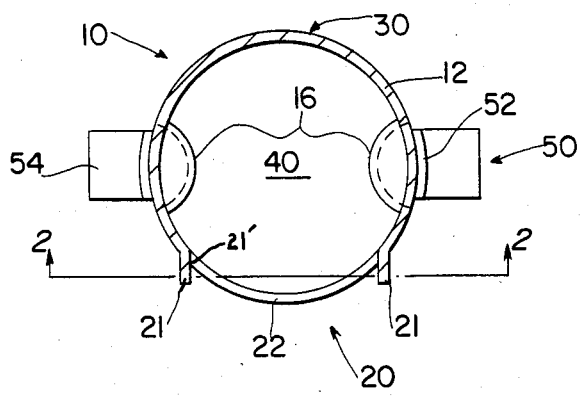
FIGS. 1–3 depict a preferred embodiment of a shell holder.
Figure 2:
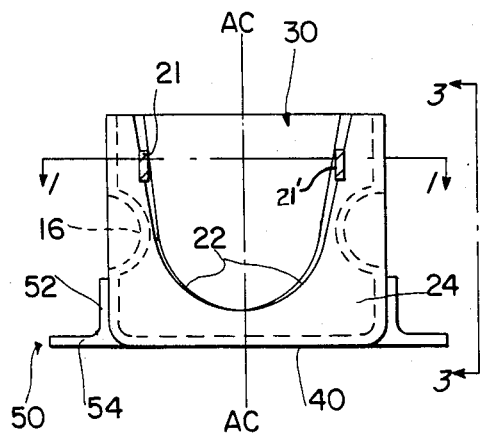
Figure 3:
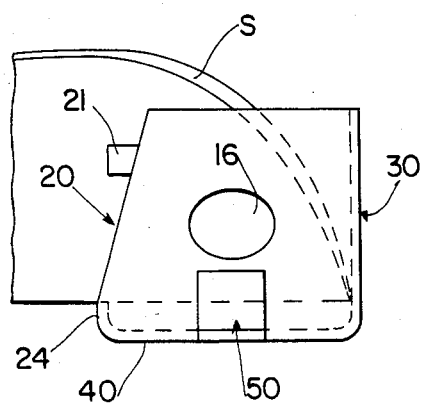

Referring now to the drawings wherein like characters and reference numerals designate like or similar parts throughout the several views, there is shown in FIGS. 1–3 a preferred embodiment of the present invention. A shell holder 10, used to engage a filled shell (note FIG. 3) at one end of the shell, includes a hollow bowl 12, preferably of cylindrical configuration having an axis of concentricity AC-AC extending substantially normal to the plane defining its bottom. The bowl 12 includes a front portion 20, a rear portion 30, a bottom wall portion 40 and side portions located between the front and rear portions in which opposing finger and thumb recesses or dimples 16 are disposed. The recesses 16 are located in the approximate middle of each side portion, and facilitate grasping of the holder 10 by the user of the device. In addition, as the side walls of the holder are flexible, they can be squeezed together to better grip the shell by exerting pressure with the thumb and finger through the dimples 16. As can be seen in the figures, the bottom wall and side wall are both smooth.

As shown best in FIG. 2, the holder 10 includes a generally U-shaped opening or cut-out 22 located in the front portion 20 of the shell holder 10. As can be clearly seen, the legs of the U extend upwardly and in a diverging outward direction from the bottom of the U, so as to conform with the common shape of a taco shell. The cut-out 22 provides an opening through which a supported food shell S projects (see FIG.3) and ensures that the filled food shell S held by the holder 10 will remain upright during the eating process until all but that portion of the shell remaining in the holder has been consumed. This upright positioning is facilitated by inserting one end of the shell S in holder 10 and cut-out 22, and butting the shell S against the back wall portion 12. The U-shaped cut-out 22 acts to grip the sides of the shell, and is dimensioned so that when the shell expands outwardly of, and normal to, its longitudinal axis, it becomes firmly wedged in the slot of the shell resting adjacent the cut-out bight, i.e. the bottom of the U of the cut-out 22. Thus, when the holder 10 is lifted, the shell remains secured in the holder and cut-out, even against the weight of the filled shell. The cut-out 22 is preferably inclined upwardly and inwardly from its bottom as shown in FIG. 3.

Additionally, to ensure a firm grip on the shell, the holder 10 is desirably provided, extending horizontally from the cut-out 22 near the top thereof, with facing opposed lips 21, each having an inwardly facing gripping surface 21'. This surface is preferably configured to provide frictional engagement with the shells, as for example, a dimpled, roughened or knurled surface. To prevent food juices from spilling into the user's hand as he eats the food, the front portion 20 of the holder is provided with a lip portion 24 disposed at the lowermost region of cut-out 22 and interconnecting the side wall portions with the bottom wall portion 40.

Two outriggers 50, 50 are desirably provided at the base of the bowl 12, preferably beneath the respective finger and thumb recesses 16, for serving as stabilizing lip means. The outriggers 50 are secured, e.g. adhesively or by heat or even mechanical means, to opposite portions of holder 10, or they may be integrally molded with the body portion 12. Such outriggers 50 include normally disposed vertical upper portions 52 and horizontal lower portions 54. The lower portions define, with the bottom wall portion 40, an extended surface projecting to opposite sides of the body 12. This extended surface provides stability for the holder 10 when used to support a filled shell in the manner described above.

Figure 4:
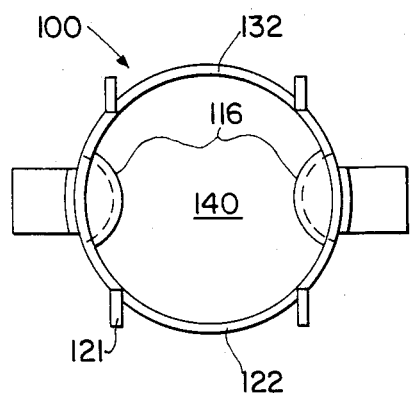
FIGS. 4–6 depict an alternative embodiment of a shell holder of the present invention, with FIG. 1 being a view of a holder 10 along line 1—1 of FIG. 2.
Figure 5:
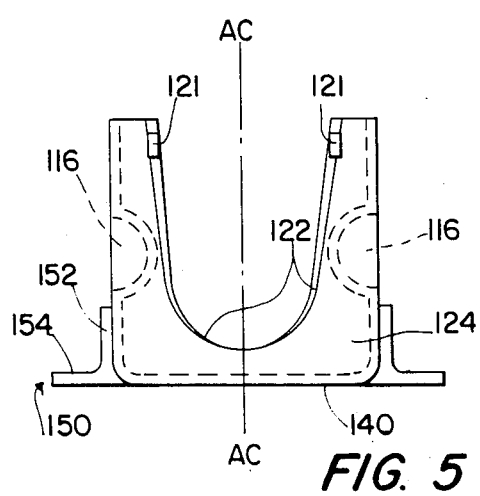
Figure 6:
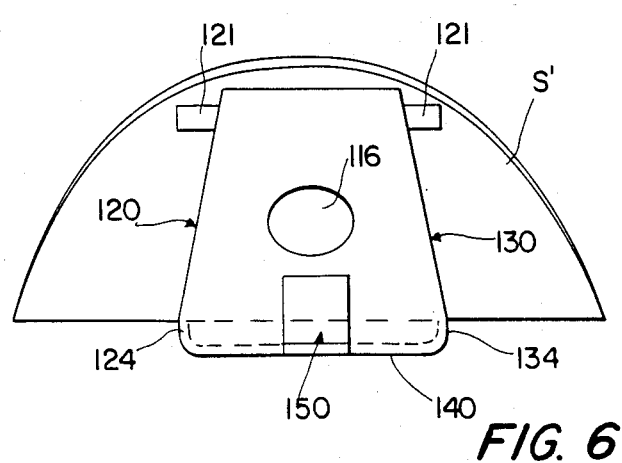

FIGS. 4–6 depict a second or alternative embodiment 100 of the present invention in which the holder includes a hollow body 112 having a front portion 120, a rear portion 130, a bottom wall portion 140 and side portions interconnecting the front, rear and bottom portions, thereby defining a hollow structure, preferably of cylindrical configuration. The side portions include indentations or recesses 116, one being disposed in the approximate middle of each side portion.

FIGS. 4 and 5 illustrate generally U-shaped cut-outs 122, 132, which have been removed or cut-out of the front portion 120 and rear portion 130, respectively. The front cut-out 122 and the rear cut-out 132 make this embodiment 100 particularly suitable to facilitate placement of an empty shell S' in the holder 100 so that the shell may be filled in preparation for consumption. Both the front portion 120 and the rear portion 130 are provided with upstanding lip portions at the lowermost region of the front cut-out 122 and the rear cut-out 132, respectively. The height of the lip portions is less than the height of the finger recesses 116, and thus by interconnecting the bottom wall portions 140 with the opposing side wall portions, the front lip portion 124 and the rear lip portion 134 together define a receptacle or holder into which the shell will be placed, and in which juices and solid spillage will be retained.

As in the embodiment of FIGS. 1–3, the FIGS. 4–6 embodiment may also include facing opposed lips 121, 121 located at both cut-outs and provided with gripping surfaces, in a manner similar to that described for the FIGS. 1–3 embodiment. Secured to opposite sides of holder 100 preferably in the vicinity of the finger recesses 116, 116, outriggers 150, 150 are desirably placed. Each outrigger 150 comprises a vertical upper portion 152 and a horizontally extending lower portion 154. As in the embodiment of FIGS. 1–3, the outriggers 150, 150 together with the bottom wall portion 140 define an extended surface which projects to opposite sides of the bottom wall portion 140. In this way, holder 100 is provided with increased stability and securely supports a shell in an upright position during preparation, i.e. filling, of the shell S'.

The holder 10, 100 may be fabricated in a particularly inexpensive manner by cutting same from discarded plastic bottles. Such devices may alternatively be molded by conventional techniques, e.g. blow molding, preferably from relatively thin and inexpensive plastic, e.g. polyolefin or polystyrene, or they may be molded from more permanent materials such as glass, ceramic or even stainless steel.

Such devices are easily cleaned as they are cylindrical, with no corners. The holders are preferably of small size, e.g. about 1⅜" in diameter.

The foregoing description of the specific embodiments will so fully reveal the general nature of the invention that others can, by applying current knowledge, readily modify and/or adapt for various applications such specific embodiments without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A taco holder for supporting a fillable taco shell, comprising:
  bowl means having a generally flat and smooth base, a smooth and generally cylindrical flexible side wall and an axis of concentricity normal to said bottom,
  said bowl means including means for supporting the taco shell in an upright position and normal to the axis of concentricity, and comprising at least one generally smooth U-shaped cut in the side wall of said bowl means, the legs of the U extending upwardly and in a diverging outward direction from the bottom of the U, and the cylindrical side wall below the height of the bottom of the U extending upwardly from said base; and
  stabilizing lip means for stabilizing said bowl on a supporting surface, said stabilizing lip means being at the base of said bowl means and extending outwardly therefrom.

2. The holder of claim 1 wherein said supporting means comprises a single said U-shaped cut forming an opening in a portion of the wall of said bowl, said opening defining means for gripping one end of said shell.

3. The holder of claim 1 wherein said stabilizing lip means comprises opposing feet extending normal to, and away from the axis of concentricity of said bowl.

4. A holder according to claim 1 wherein said supporting means comprises a pair of said U-shaped cuts disposed opposite one another.

5. A holder for supporting a fillable food shell, comprising:
  bowl means having a generally cylindrical wall and a generally flat base and an axis of concentricity normal to said base,
  said bowl means including means for supporting the food shell in an upright position and normal to the axis of concentricity, and comprising at least one generally U-shaped cut in the wall of said bowl means above said base, opposing depressions being provided in a portion of said bowl wall adjacent said U-shaped cut, said depressions enabling the holder to be grasped between the thumb and finger and lifted from the supporting surface.

6. The holder of claim 5 wherein said bowl means is sufficiently flexible so that the gripping thereof at said depressions permits flexing of said bowl to grip a shell contained therein.

7. A holder for supporting a fillable food shell, comprising:

generally cylindrical bowl means having a generally flat bottom and an axis of concentricity normal to said bottom, said bowl means including means for supporting the food shell in an upright position and normal to the axis of concentricity, and comprising at least one generally U-shaped cut in the side wall of said bowl means, and a pair of facing gripping lips lying adjacent the U-shaped cut and projecting beyond the cylinder of the bowl, said gripping lips having roughened inwardly facing surfaces.

8. A taco holder for supporting a fillable taco shell, comprising:

bowl means having a generally flat and smooth and generally cylindrical side wall and an axis of concentricity normal to said bottom, said bowl means including means for supporting the taco shell in an upright position and normal to the axis of concentricity, and comprising at least one generally U-shaped cut in the side wall of said bowl means, the legs of the U extending upwardly and in a diverging outward direction from the bottom of the U, and further including opposing depressions in a portion of said bowl wall adjacent said U-shaped cut, said depressions enabling the holder to be grasped between the thumb and finger and lifted from the supporting surface.

* * * * *